United States Patent
Aksoy et al.

(10) Patent No.: US 11,582,990 B2
(45) Date of Patent: Feb. 21, 2023

(54) ANIMAL FEED BINDERS DERIVED FROM PECTIN- AND PROTEIN-CONTAINING FEEDSTOCK

(71) Applicants: Auburn University, Auburn, AL (US); The United States of America, as represented by the Secretary of Agriculture, Washington, DC (US)

(72) Inventors: Burak Aksoy, Auburn, AL (US); Zhihua Jiang, Auburn, AL (US); Mediha Aksoy, Auburn, AL (US); Benjamin Beck, Auburn, AL (US)

(73) Assignees: Auburn University, Auburn, AL (US); The United States of America, as Represented by the Secretary of Agriculture, Washington, DC (US)

( * ) Notice: Subject to any disclaimer, the term of this patent is extended or adjusted under 35 U.S.C. 154(b) by 484 days.

(21) Appl. No.: 16/745,562

(22) Filed: Jan. 17, 2020

(65) Prior Publication Data

US 2020/0229467 A1    Jul. 23, 2020

Related U.S. Application Data

(60) Provisional application No. 62/793,649, filed on Jan. 17, 2019.

(51) Int. Cl.
| | | |
|---|---|---|
| *A23K 40/25* | (2016.01) | |
| *A23K 20/147* | (2016.01) | |
| *A23K 20/163* | (2016.01) | |
| *A23K 40/10* | (2016.01) | |
| *A23K 50/80* | (2016.01) | |
| *A23K 10/30* | (2016.01) | |

(52) U.S. Cl.
CPC .............. *A23K 40/25* (2016.05); *A23K 10/30* (2016.05); *A23K 20/147* (2016.05); *A23K 20/163* (2016.05); *A23K 40/10* (2016.05); *A23K 50/80* (2016.05)

(58) Field of Classification Search
CPC ...... A23K 20/163; A23K 40/25; A23K 10/37; A23K 10/12; A23K 10/30; A23K 50/80; A23K 40/10; A23K 20/147; A23K 40/00; Y02A 40/818; Y02P 60/87
See application file for complete search history.

(56) References Cited

U.S. PATENT DOCUMENTS

| 4,089,980 A | 5/1978 | Berger et al. |
| 2008/0293927 A1 | 11/2008 | Strahm |

FOREIGN PATENT DOCUMENTS

| GB | 1534615 | 12/1978 |
| WO | 2012/175920 | 12/2012 |

OTHER PUBLICATIONS

Moura et al., "Characterization and physiochemical properties of pectins extracted from agroindustrial by-products," Journal of Food Science and Technology, Aug. 2, 2017, 54(10): 3111-3117;DOI : 10.1007/s13197-017-2747-9.
International Search Report and Written Opinion for PCT/US2020/013997 dated Apr. 14, 2020.
International Preliminary Report on Patentability for International application PCT/US2020/013997, dated Jul. 29, 2021, from the International Bureau of WIPO.

*Primary Examiner* — Aaron J Kosar
(74) *Attorney, Agent, or Firm* — Christopher M. Scherer; Joseph T. Leone; DeWitt LLP

(57) ABSTRACT

A method of making a binder for extruded, pelleted, or agglomerated animal feed. The binder is made by treating biomass such as soybean hull or lemon peels with an aqueous acidic solution for a time, at a temperature, and at a pH sufficient to yield a first mixture containing biomass solids and partially dissolved biomass; and mechanically treating the first mixture of step to yield a first mechanically treated mixture; and then incorporating the first mechanically treated mixture as a binder in an animal feed. Also described are animal feeds made using the binder.

21 Claims, 12 Drawing Sheets

ANIMAL FEED BINDERS DERIVED FROM PECTIN- AND PROTEIN-CONTAINING FEEDSTOCK

CROSS-REFERENCE TO RELATED APPLICATIONS

Priority is hereby claimed to provisional application Ser. No. 62/793,649, filed Jan. 17, 2019, which is incorporated herein by reference.

BACKGROUND

Manufactured animal feeds are a staple product of commerce. A host of natural products, such as wheat gluten, high-gluten wheat flour, and other starch-rich ingredients (rice, sorghum, corn, etc.) are used as binders in animal feeds (e.g., feeds for ungulates and swine, poultry feeds, fish feeds, shrimp feeds, feeds for domestic pets such as cats and dogs, etc.). Modified substances such as carboxymethyl cellulose, alginate, propylene glycol alginate and lignin sulfonate, as well as synthetic binders such as sodium or calcium bentonite, polyvinyl alcohol, and urea formaldehyde have also been used as binders. They vary widely in cost, performance, and beneficial vs. adverse impacts on animal health.

For example, extrusion cooking devices have long been used to make a wide variety of dry animal feeds, such dry dog food, cat food, and poultry feeds. The basic process is very straightforward conceptually, but much more complex in practice. The food material to be processed is passed through a temperature-controlled extruder barrel where it is subjected to increasing levels of temperature, pressure, and shear. As the material emerges from the extruder die, it is fully cooked and shaped. The conventional practice is to subdivide the product into pellets as it exits the extruder using a rotating knife assembly. See, for example. U.S. Pat. No. 10,383,347, issued Aug. 20, 2019, which describes an extruded animal feed that comprises a gelatin binder and a low starch content.

Animal feeds made via extrusion (as well as via other methods) typically include a binder to improve internal cohesive strength of the extruded, pelleted product. The binder provides a host of functional advantages to the final product. Most notably, the binder brings the food portions of the feed ration together so that the final product can be readily ingested by the target animal. At the same time, it makes the pelleted or agglomerated final product less likely to fracture during shipment, storage, and dispensing. This greatly cuts down on the creation of dust and fines, which leads to waste. In the context of extruded feeds, starches and modified starches are widely used as binders because they gelatinize under the conditions typically encountered during extrusion, which helps adhere the food components to one another.

As a general proposition, animal feeds are produced with low-cost, by-product food ingredients that cannot be sold in the human food market. The conventional, low-cost binders, though, do not yield feed pellets that are sufficiently durable. In addition to starch, mentioned above, various protein colloids, carboxylmethyl cellulose, lignosulfonate-starch blends, and urea formaldehyde resins have been used as animal feed binders. U.S. Pat. No. 5,714,184, issued Feb. 3, 1998, even describes a method and composition of matter that uses sodium carbonate pulping liquor (from papermaking) as a pellet binder for animal feed.

See also U.S. Pat. No. 4,996,065, issued Feb. 26, 1991, which describes a molasses-free, chemically reactive binder for animal feed.

U.S. Pat. No. 4,988,520, issued Jan. 29, 1991, describes a binder comprising water-soluble calcium compounds, such as calcium hydroxide, calcium oxide, calcium chloride, and calcium acetate.

U.S. Pat. No. 4,952,415, issued Aug. 28, 1990, describes an animal feed composition that uses a polymer made from carboxylic acid-containing monomers as a binder, for example polymers made from polyacrylic acid, polymaleic acid, and polymethacrylic acid.

U.S. Pat. No. 4,153,735, issued May 8, 1979, describes a binder that contains a salt of a fatty acid, a hydrogenated lipid, and a water-soluble anionic polymer.

While some of these products do provide some improvement in pellet quality, there is much room for improvement.

SUMMARY

The objective of this project is to introduce a novel, new class of feed binder from pectin, protein and holocellulose rich feedstocks. This novel class of feed binder is produced inexpensively with few process steps in Auburn University AC-PABE laboratories. It is also found throughout studies performed in USDA-ARS-Aquatic Animal Health Research laboratories that novel soy hull binders improve feed formulations and decrease feed wastages and improve growth performance, feed utilization efficiency, nutrient retention, water quality, and animal health.

A first version of the disclosure is a method of making a binder for extruded, pelleted, or agglomerated animal feed. The method comprises treating biomass with an aqueous acidic solution for a time, at a temperature, and at a pH sufficient to yield a first mixture containing biomass solids and partially dissolved biomass. The mixture is then mechanically treated (i.e., vigorously mixed/comminuted) to yield a first mechanically treated mixture. The first mechanically treated mixture is then incorporated as a binder in an animal feed.

In all versions of the method disclosed herein, the biomass may be treated with an aqueous mineral acid, such as sulfuric acid or hydrochloric acid.

In all versions of the method disclosed herein, the binder made according to the method may be incorporated into an aquatic animal feed, including feed for crustaceans and finish in general and shrimp in particular. In the same vein, in all versions of the method disclosed herein, the binder made according to the method may be incorporated into feeds for terrestrial animals without limitation, including poultry, swine, cattle, ungulates, canines, felines, and the like.

The biomass used in the method is preferably (but not limited to) soybean hulls, citrus peels, sugar beet pulp, fruit and vegetable pomace (for example, from apples, passion fruit, olives, grapes, etc.), rapeseed cake, and the like.

In a second version of the method, after the mechanical treatment, at least a portion of solids present in the first mechanically treated mixture are separated from the liquids to yield a solids fraction (which is used in the third version) and the remaining first mechanically treated mixture (a liquid that also includes small fines of solids).

A third version of the method further comprises treating the solids fraction with an aqueous, alkaline solution for a time, at a temperature, and at a pH sufficient to yield a second mixture containing biomass solids and partially dissolved biomass. At least a portion of solids present in the second mechanically treated mixture is separated from the liquid to yield a solids fraction and the remaining second mechanically treated mixture.

The second mechanically treated mixture is then combined with the first mechanically treated mixture. The combined first and second mechanically treated mixtures are then used as a binder in an animal feed.

Disclosed and claimed herein are the following:

1. A method of making a binder for extruded, pelleted, or agglomerated animal feed, the method comprising:
    (a) treating a feedstock comprising pectin-containing and protein-containing biomass with an aqueous acidic solution for a time, at a temperature, and at a pH sufficient to yield a mixture containing biomass solids and partially dissolved biomass, wherein acid within the aqueous acidic solution is added exogenously or is formed in situ; and
    (b) mechanically treating the feedstock or the mixture of step (a) to yield a first mechanically treated mixture; and then
    (c) incorporating the first mechanically treated mixture of step (b) as a binder in an animal feed.

2. The method of claim 1, wherein step (c) comprises incorporating the first mechanically treated mixture as a binder in an aquatic animal feed.

3. The method of claim 2, wherein step (c) comprises incorporating the first mechanically treated mixture as a binder in an aquatic animal feed for crustaceans.

4. The method of claim 3, wherein step (c) comprises incorporating the first mechanically treated mixture as a binder in an aquatic animal feed for shrimp.

5. The method of claim 1, wherein the biomass is selected soybean hulls, citrus peels, sugar beet pulp, fruit pomace, vegetable pomace, and rapeseed cake.

6. The method of claim 5, wherein step (c) comprises incorporating the first mechanically treated mixture as a binder in an aquatic animal feed.

7. The method of claim 6, wherein step (c) comprises incorporating the first mechanically treated mixture as a binder in an aquatic animal feed for crustaceans.

8. The method of claim 7, wherein step (c) comprises incorporating the first mechanically treated mixture as a binder in an aquatic animal feed for shrimp.

9. The method of claim 1, wherein step (b) further comprises separating at least a portion of solids present in the first mechanically treated mixture to yield a solids fraction and the remaining first mechanically treated mixture.

10. The method of claim 9, wherein the biomass is selected from soybean hulls, citrus peels, sugar beet pulp, fruit pomace, vegetable pomace, and rapeseed cake.

11. The method of claim 9, wherein step (c) comprises incorporating the first mechanically treated mixture as a binder in an aquatic animal feed.

12. The method of claim 11, wherein step (c) comprises incorporating the first mechanically treated mixture as a binder in an aquatic animal feed for crustaceans.

13. The method of claim 12, wherein step (c) comprises incorporating the first mechanically treated mixture as a binder in an aquatic animal feed for shrimp.

14. The method of claim 9, further comprising:
    (b)(i) treating the solids fraction with an aqueous, alkaline solution for a time, at a temperature, and at a pH sufficient to yield a second mixture containing biomass solids and partially dissolved biomass; and then
    (b)(ii) separating at least a portion of solids present in the second mixture to yield a solids fraction and the remaining second mixture; and then
    (b)(iii) combining the second mixture with the first mechanically treated mixture; and
    wherein step (c) comprises incorporating the combined first mechanically treated mixture and the second mixture of step (b)(iii) as a binder in an animal feed.

15. The method of claim 14, wherein the biomass is selected from soybean hulls, citrus peels, sugar beet pulp, fruit pomace, vegetable pomace, and rapeseed cake.

16. The method of claim 14, wherein step (c) comprises incorporating the first mechanically treated mixture combined with the second mixture as a binder in an aquatic animal feed.

17. The method of claim 16, wherein step (c) comprises incorporating the first mechanically treated mixture combined with the second mixture as a binder in an aquatic animal feed for crustaceans.

18. The method of claim 17, wherein step (c) comprises incorporating the first mechanically treated mixture combined with the second mixture as a binder in an aquatic animal feed for shrimp.

19. An animal feed comprising a binder made according the process recited in claim 1.

20. An animal feed comprising a binder made according the process recited in claim 9.

21. An animal feed comprising a binder made according the process recited in claim 14.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present disclosure shall include the corresponding plural characteristic or limitation, and vice-versa, unless otherwise specified or clearly implied to the contrary by the context in which the reference is made. That is, unless specifically stated to the contrary, "a" and "an" mean "one or more." The phrase "one or more" is readily understood by one of skill in the art, particularly when read in context of its usage. For example, "one or more" substituents on a phenyl ring designates one to five substituents.

All combinations of method or process steps as used herein can be performed in any order, unless otherwise specified or clearly implied to the contrary by the context in which the referenced combination is made.

The methods and compositions disclosed and claimed herein can comprise, consist of, or consist essentially of the essential elements and limitations of the method described herein, as well as any additional or optional ingredients, components, steps, or limitations described herein or otherwise useful in formulating animal feeds generally and feeds for aquatic organisms in particular.

The terms "contacting" and "treating" are synonymous and refer to the act of touching, making contact, or of bringing to immediate or close proximity, including at the molecular level, for example, to bring about dissolution, a chemical reaction, or a physical change, e.g., in a solution or in a reaction mixture.

An "effective amount" refers to an amount of a chemical or reagent effective to facilitate a chemical reaction between two or more reaction components, and/or to bring about a recited effect. Thus, an "effective amount" generally means an amount that provides the desired effect.

DETAILED DESCRIPTION

Figure 1:
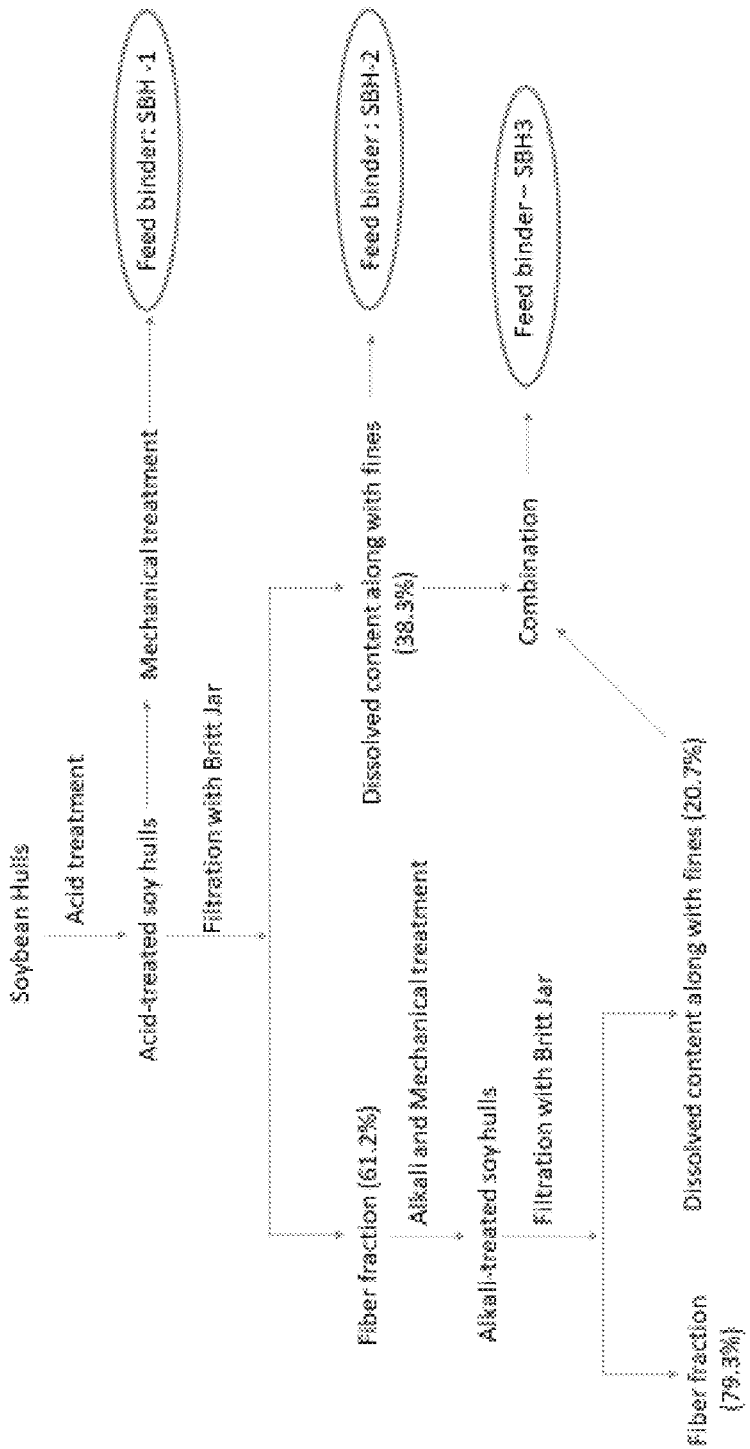
FIG. 1 is a flow chart showing the steps used to make the biomass-based (in this example soybean hull-based) feed binder with mass balances.

Abbreviations and Definitions:

Acids and base/alkali=these terms are used in their common sense as understood by food chemists. Acids include, without limitation, mineral and organic acids. Common mineral acids include, without limitation, hydrochloric acid, sulfuric acid, nitric acid, and the like. Common organic acids include, without limitation, lactic acid, acetic acid, formic acid, citric acid, oxalic acid, uric acid, malic acid, etc. Like the acids, both mineral and organic bases may be used. Common strong mineral bases include Lithium hydroxide (LiOH), sodium hydroxide (NaOH), potassium hydroxide (KOH), and the like. Common organic bases include ammonia, alkanamines such as methyl amine, pyridine, imidazole, benzimidazole, and the like.

Biomass=the organic materials produced by plants and animals, such as cobs, husks, leaves, roots, seeds, shells, and stalks, as well as microbial and animal metabolic wastes (e.g., manure), without limitation. Common sources of biomass include (without limitation): (1) agricultural wastes, such as corn cobs and stalks, straw, seed hulls, sugarcane leavings, bagasse, nutshells, citrus peels, fruit and vegetable skins, egg shells, and manure from cattle, poultry, and hogs; (2) woody materials, such as wood or bark, sawdust, timber slash, and mill scrap; (3) municipal waste, such as waste paper and yard clippings; (4) energy crops, such as poplars, willows, switch grass, alfalfa, prairie bluestem, corn, soybean; and (5) coal, peat moss, and the like. The term "biomass-derived" refers to any reactant or material that can be fabricated from biomass by any means now known or developed in the future, including (without limitation) polysaccharides, monosaccharides, polyols, oxygenated hydrocarbons, sugars, starches, and the like.

CMC=carboxymethylcellulose.

Holocellulose=the total polysaccharide fraction of wood, straw, and other plant material, consisting essentially of cellulose and all of the hemicelluloses.

Mechanically treated/mechanical treatment=a physical process comprising repeated plastic deformation of a mixture. Mechanical treatments can include or involve high-energy milling, low-energy milling or any other conventional mechanical deformation process, using any suitable equipment now known or developed in the future that are dimensioned, are configured, and function to cause the particles in a mixture (monophasic or multiphasic) to mix thoroughly. Methods of mechanically treating the biomass feedstock include, for example, milling or grinding. Milling may be performed using, for example, a hammer mill, ball mill, colloid mill, conical or cone mill, disk mill, edge mill, Wiley mill, grist mill or other mill. Grinding may be performed using, for example, a cutting/impact type grinder.

Some exemplary grinders include stone grinders, pin grinders, coffee grinders, and burr grinders. Grinding or milling may be provided, for example, by a reciprocating pin or other element, as is the case in a pin mill. Other mechanical treatment methods include mechanical ripping or tearing, other methods that apply pressure to the fibers, and air attrition milling. Mechanical treatment may also be aided by additional (and optional) treatments applied simultaneously or sequentially, such as enzymatic digestion, elevated heat (radiant, convection, microwave, etc.) and ultrasonic processing. These optional treatments can be useful tools to assist the acid and mechanical treatment of the pectin- and protein-containing feedstock.

Introduction:

Pectin-, protein-, and holocellulose-rich plants such as soybean hull, rapeseed cake, and sugar beet pulp are abundantly and inexpensively available. Processes to produce these biodegradable and renewable materials are also simple and inexpensive. Disclosed and claimed herein are animal feed binders (including binders used in feeds for aquatic organisms) produced from pectin, protein, and holocellulose derived from biomass such as soybean hull, rapeseed cake, sugar beet pulp, and citrus peels (e.g., the peels of lemons, limes, oranges, grapefruit, and the like), was well as the resulting formulated animal feeds. Also disclosed herein is a method to make the animal feeds using these types of binders.

Each of these plant and biomass components assists in the binder system formation via a synergetic effect with the other components of the animal feed. The process steps include treating the biomass in an acidic aqueous solution, at room temperature or elevated temperatures up to about 200° C., at atmospheric or elevated pressure, for a period up to about 24 hours. The resulting mixture, containing both dissolved substances and solids, may be used as a feed binder, as it. Or, the insoluble material may be removed by filtration and the filtrate alone used as the binder.

Yet a third version of the binder may be made by taking the fiber fraction remaining after acid treatment, and adjusting its pH to basic (preferably to at least pH 7.5 or above) by adding an aqueous alkali solution at room or elevated temperatures and for a time sufficient to completely or to partially dissolve any pectin, protein, and holocellulose present in the filter cake. The filter cake/aqueous alkaline solution may be mechanically treated and the solids separated from the solution. The alkaline solution (along with any fines) can be combined with the filtrate from acid-only treated biomass to yield a third alternative version of the binder.

If the biomass being treated is agglomerated or if the biomass particle size is large, it may then optionally be mechanical treated in the aqueous solution to reduce the particle size of the mass. Mechanical means to reduce particle size are conventional and well known (e.g., mixers, vibrators, pulverizers, ball mills, paddle mills, etc.) Mechanical treatment also serves to homogenize the dissolved components.

The resulting mixture is then screened, sieved, or filtered to separate the dissolved pectin and proteins from the cellulose. The pH of the solution of dissolved pectin and proteins may then be adjusted (if needed or if desired) by adding a suitable amount of alkali or acid. The resulting solution is then used "as is" (that is, in solution form) as a binder for animal feeds in general and aquatic animal feeds in particular.

The fundamental process, using soybean hulls, is shown as a flow chart in FIG. 1. The same process can be performed using any other type of biomass, such as the lemon peel-derived binders described in the Examples.

As shown in FIG. 1, soybean hull binder was treated in water with acid at pH 1.8, 95° C., and atmospheric pressure for 60 minutes, at a liquid-to-solid ratio of 9 to 1 (wt/wt). Acid-treated sample was then mechanically comminuted for 30 minutes with a heavy-duty blender. The resulting product as a whole (liquid and remaining solids) was used as a feed binder (SBH-1). SBH-1 contained 19.1% dissolved solid, indicating that after the acid treatment, 19.1% percentage of soybean hull components were dissolved and activated for enhanced binding properties as a feed binder.

The feed binder SBH-2 was prepared by applying the same acid treatment conditions as used in preparing SBH-1. After the acid treatment, the liquid was separated from the solids using a Britt drainage jar having a screen with a nominal pore size of 176 μm. The dissolved content (19.1 wt %) along with fines small enough to pass through the Britt jar (19.7 wt %) was used as a feed binder (SBH-2).

The fiber retained on top of the Britt Jar was then alkali treated at room temperature at pH of 9 under high shear agitation using heavy-duty blender for 30 minutes. After the alkali treatment, a filtration in a Britt Jar screen with an opening of 176 μm was again applied to the alkali-treated soybean hulls to separate them into two fractions. The dissolved content (8.4%) along with fines (12.3%) passing through the filtration were combined with the SBH-2 to make another feed binder (SBH-3).

Early studies of the soybean hull-based feed binder focused on catfish feed pellets and compared then to a commonly used CMC binder for dry strength and water stability. Soy hull-derived binder outperformed CMC binder in both of these very important aquatic organism feed properties. The preliminary results encouraged further evaluation of the biomass-derived feed binder on an animal feed type that regularly encounters extreme conditions: shrimp feed.

Diet Preparation and Pelleting:

A basal practical diet was formulated to contain approximately 41.6% crude protein and 7.6% lipid (see Table 1). Dry ingredients were thoroughly mixed for 10 min in a Hobart mixer before the oil was added. After the oil was diffused, the required amount of liquid soy hull binders and deionized water was added to make approximately 300 ml of per kg of the diet. The moist mixture was extruded through a 2.5 mm circular cross-section stranding die using a Hobart single-screw extruder/meat grinder. This yielded moist, formulated feeds in a stranded form strongly resembling conventional spaghetti. The resulting moist strands were air-dried at room temperature to a moisture content of about 10%.

TABLE 1

Percentage composition of experimental basal diet

| | Experimental Diet (%) |
|---|---|
| Menhaden fish meal | 20 |
| Squid meal | 12 |
| Soybean meal | 28 |
| Cottonseed meal | 8 |
| Wheat short | 10 |
| Whole corn meal | 10 |
| Fish oil | 3.3 |
| Soy lecithin | 1 |
| Cholesterol | 0.2 |
| Dicalcium Phosphate | 1 |
| Potassium Phosphate | 1 |

TABLE 1-continued

Percentage composition of experimental basal diet

| | Experimental Diet (%) |
|---|---|
| Binders[1] | 2 |
| Vitamin premix[2] | 1 |
| Mineral premix[3] | 0.5 |
| Celufil | 2 |

[1]Binders used were as follows:
Diet 1 = carboxymethylcellulose (CMC)
Diet 2 = corn starch (CS)
Diet 3 = wheat gluten (WG)
Diet 4 = soy hull fibers and acidic extract combined
Diet 5 = acidic extract only
Diet 6 = acidic and alkali extracts combined
All the aforementioned extracts contained a small amount of soy hull fines that filtered through the screening process.
[2]Vitamin premix, diluted in cellulose, provided by following vitamins, per mg/kg diet): vitamin A (520,400 IU/g), 5.8; vitamin D3 (108,300 IU/g), 18.5; vitamin E (250 IU/g), 1200; vitamin K, 10; thiamin, 80; riboflavin, 60; pyridoxine, 70; calcium pantothenate, 150; nicotinic acid, 100; folic acid, 20; vitamin B12, 0.4; biotin, 2; choline chloride, 1500; and L-ascorbyl-2-polyphosphate (35% vitamin C activity), 500.
[3]Trace mineral premix provided by following minerals (mg/kg diet): zinc (as $ZnSO_4$—$7H_2O$), 100; iron (as $FeSO_4$—$7H_2O$), 40; manganese (as $MnSO_4$—$7H_2O$), 5; copper (as $CuI_2$), 10; iodine (as KI), 4; cobalt (as $COCl_2$—$6H_2O$), 0.04; selenium (as Na + $SeO_3$), 0.1; magnesium (as $MgSO_4 \cdot 7H_2O$), 130; sodium (as $NaH_2PO_4$), 15; and calcium (as $CaCO_3$), 100.

Dry Stability Test:

Dry strength was evaluated by weighing 500 g of each feed sample in the form of extruded rods resembling commercial spaghetti. These dry rods were then ground into small pieces using a feed grinded and sieved to separate broken pellets from dust. Recovered pellets and dust were weighted and the proportion of feed loss then was calculated. Experimental diets were stored frozen in plastic bags at −20° C. until used. See FIG. 2.

Effectively, this testing measures the amount of fines, powder, or dust formed in each diet in the process of size-reducing the dry feed formulations to an appropriate size. (In this instance, a size appropriate to feed shrimp.)

Water Stability of Pelleted Feeds:

The water stability of the feed pellets was determined at 3, 6, 12, 24, and 48 hours post-immersion, at two different water temperatures (22° C. and 28° C.) using the following protocol:

Water temperature was adjusted by using aquarium heaters. Before use, sieves to hold the feed samples (15-cm diameter×5 cm height with 1.5-mm mesh screen) were thoroughly washed, dried in an oven at 100° C., and weighed. Five (5) g samples of feed pellets (pre-dried at 80° C.) were placed into each sieve and lowered into an aquarium. The aquarium was filled with well water to a level just below the rim of the sieve. The salinity of water was adjusted to 23 ppt. The pellets were gently and continuously agitated by an air stone placed directly under the sieve. After each time period (3, 6, 12, 24, and 48 hours), the sieves were gently removed from the water, tipped slightly to let excess water drip off, dried in an oven at 80° C. for 24 hours, cooled to room temperature in a desiccator, and weighed. Each sample for each time period was repeated 4×. The proportion of feed loss then was calculated. See FIGS. 3 and 4. See also the Examples for further details.

Experimental Shrimp, Feeding Trial and Sampling:

Three experimental soy hull binders were selected from the water stability testing described previously. Three control diets were fabricated using conventional binders (CMC, corn starch and wheat). These six (6) feeds (three experimental feeds made according to the present disclosure and the three control feeds) were used for shrimp feeding.

The growth trial was conducted at the USDA-ARS, Aquatic Animal Health Research Unit, Auburn, Ala., USA. Pacific white shrimp, *Litopenaeus vannamei*, were acclimated to a basal diet for 2 weeks before stocking. At the end of the acclimation period, shrimp (average weight of 6.08±0.04 g) were randomly stocked into 21 (75 L) aquaria at a density of 18 shrimp per aquarium. A piece of PVC pipe was added in each tank to act as a shelter. The tanks were covered with netting to prevent losses caused by jumping. Each experimental diet was then assigned to three replicate tanks. Shrimps were fed one of the six diets at 4% total body weight daily. Feeds were offered five times daily at 06:00, 10:00, 13:00, 16:00 and 20:00 using automated feeders. Shrimp in each aquarium were group-weighed and counted at the end of the six-week trial. See FIG. 5.

Water Quality Monitoring:

Aquaria were supplied with recirculating, dechlorinated, and salted (23 ppt) well water maintained at approximately 27-28° C. Water was continuously aerated using air stones. Water temperature, dissolved oxygen, and salinity in four randomly chosen aquaria were measured daily in the morning before the first feeding, using a YSI model 58 Oxygen Meter (YSI, Inc., Yellow Spring, Ohio, USA). During the trial, water temperature averaged 27.4° C., dissolved oxygen averaged 5.38 mg/L, and salinity averaged 23ppt. Water samples were collected from the reservoir once weekly and total ammonia-nitrogen (TAN), nitrite, and nitrate concentrations were measured. The photoperiod was maintained at a 12-hour:12-hour light:dark schedule.

Statistical Analysis:

Weight gain data were analyzed by one-way ANOVA using the general linear model. If there was a significant F-test, subsequent comparisons of treatment means were determined using the Dunnett's multiple range test. Differences were considered significant at the 0.05 probability level. All statistical analyses were performed using Graphpad Prism 6.0-brand software (San Jose, Calif., USA).

EXAMPLES

The following Examples are provided solely to provide a more complete description of the composition of matter disclosed and claimed herein. The Examples do not limit the scope of the claims in any fashion.

Example 1

Dry Strength

Feed stability is considered a crucial requirement for aquatic organisms. Dry strength or the physical quality of feed is important for modern and intensive fish and crustacean farming to reduce waste during handling, transporting, and dispensing the feed into the aquatic medium. In large-scale commercial fish farms and shrimp farms, tons of feed are transported daily between storage silos and/or sea cages. Feed pellets that are easily crushed create dust and fines that the animals will not eat. This leads to increased feed costs for the farmers (a direct financial loss) as well as to various externalities, such as increased water pollution.

Figure 2:
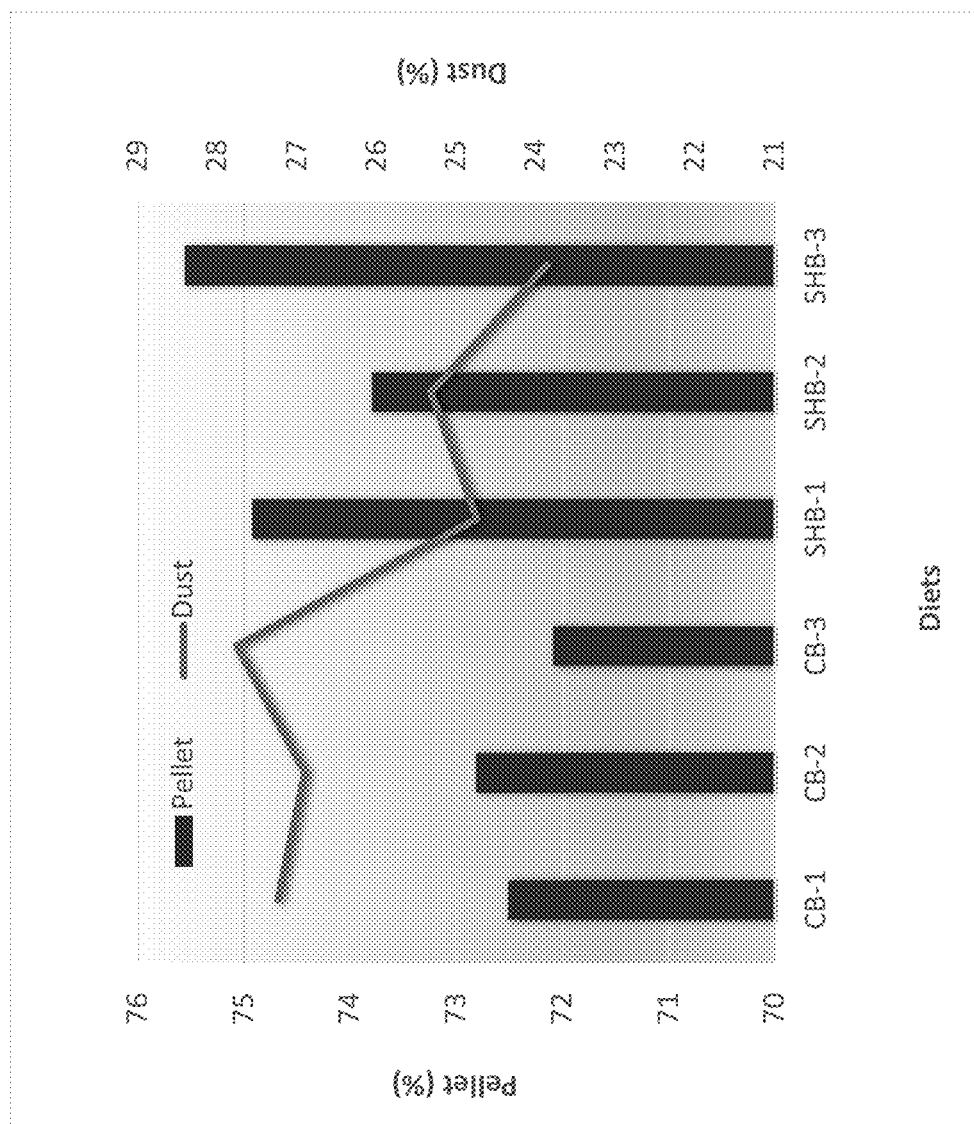
FIG. 2 is a histogram comparing the dry strength of control diets (diet 1, diet 2 and diet 3) versus the dry strength of the inventive diets described herein (diet 4, diet 5, diet 6 and diet 7).

Regardless of the processing type, soy hull binder showed stronger dry strength by producing less dust then all three control binders used. See FIG. 2. The control binders used in the feeds described in FIG. 2 are among the most common binders used in aquatic animal feeds. FIG. 2 compares the dry strength of the control diets (diet 1, diet 2 and diet 3) and soy hull binder diets made according to the present disclosure (diet 4, diet 5, and diet 6). This was measured by grinding 500 g dry feed samples in the form of strands into a size appropriate for feeding shrimp. The ground feed was then sieved to separate suitably sized particles from broken pellets and dust. The starting weight was then compared to the final weight of the appropriately sized particles to determine weight loss due to the formation of dust and fines. As shown in FIG. 2, the diets made according to the present disclosure had much smaller weight losses than the control diets.

Example 2

Water Stability and Protein Loss

The six (6) feeds described earlier were tested for their water stability as also described hereinabove. See FIG. 3. For approximately the first six (6) hours after immersion in water, all of the diets (with the exception of the diets using CMC as the binder) exhibited similar recovery rates of around 80 wt %. However, diets with soy hull binders showed improved water stability as compared to the control diets over longer time periods After 48 h of water immersion, recovery of diets with control binders ranged from 0-18 wt %, while that of the diet with soy hull binders ranged from about 50 to about 56 wt %. Similarly, after 48 h of water immersion, only diets with soy hull binders were recovered, at rates ranging from about 30 wt % to about 40 wt %.

Feed for aquaculture requires an adequate level of binder to guarantee good stability in water, i.e., long enough for the animals to consume it. Feed stability is far more crucial with crustaceans (which are very slow feeders) than with fish (which are very fast feeders). Crustaceans such as crayfish, prawns, and shrimp exhibit a characteristic tendency to manipulate their food using mouth appendages before ingesting it. For this reason, the role of the binder is crucial in aquatic feeds to give the feed sufficient firmness and water stability to accommodate specific feeding behaviors.

Figure 3:
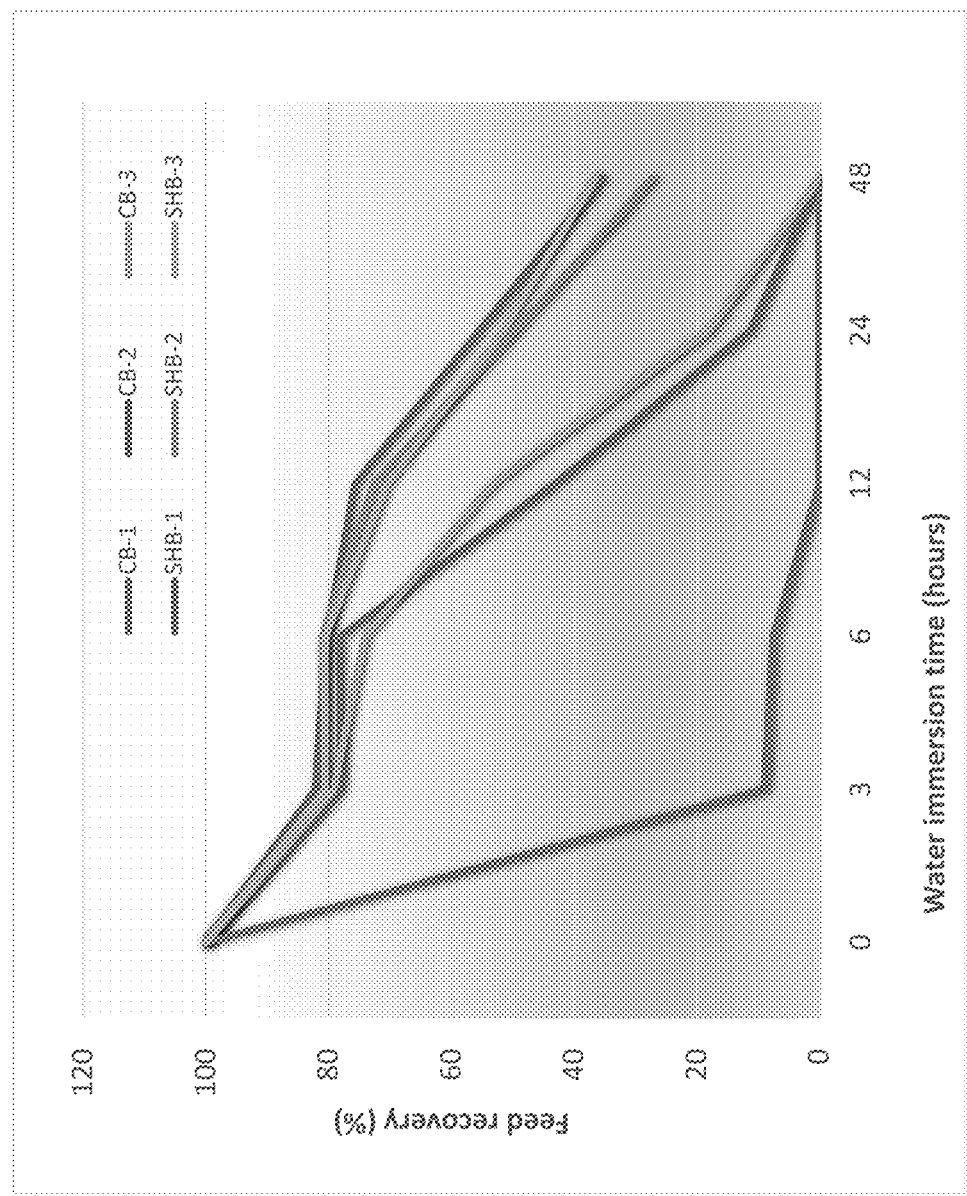
FIG. 3 is Pellet recovery (wt %) comparison of the control (diet 1, diet 2 and diet 3) and soy hull binder treatments (diet 4, diet 5, diet 6 and diet 7) tested at five leaching periods (3 h, 6 h 12 h, 24 h, and 48 h) at water temperature of 28° C. Values are the mean of four replicate runs.
Figure 4:
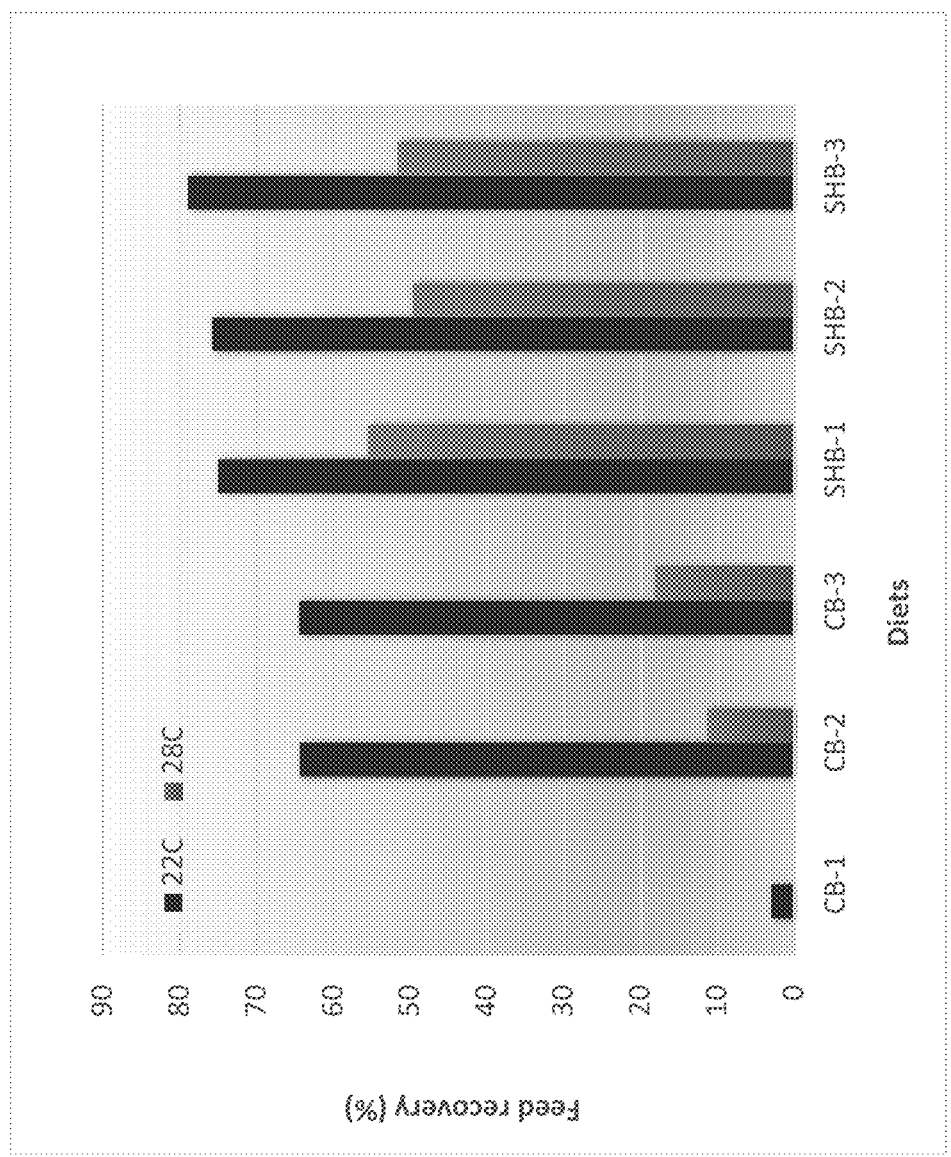
FIG. 4 is a histogram showing the effect of water temperature (22° C. and 28° C.) on pellet stability of control diets (diet 1, diet 2, and diet 3) and diets made using the soy hull-derived binders described herein (diet 4, diet 5, dirt 6 and diet 7).

FIG. 3 shows pellet recovery (%) comparison for the control diets (diet 1, diet 2 and diet 3) and soy hull binder treatments (diet 4, diet 5, and diet 6) tested at five leaching periods {3 h, 6 h 12 h, 24 h, and 48 h) at water temperature of 28° C. Values are the mean of four replicate runs. FIG. 4 shows the effect of water temperature (22° C. and 28° C.) on pellet stability of control diets (diet 1, diet 2, and diet 3) and soy hull binders (diet 4, diet 5, and diet 6) in the water after 24 h leaching period.

Regardless of the binder type, increasing water temperature from 22° C. to 28° C. reduced the water stability of all diets. In cold water, diets with a soy hull-derived binder had about 10% higher recovery than diets containing corn starch binder or wheat gluten binder after soaking in water for 24 hours. However, at a water temperature of 28° C., differences in recovery between diets with control binders (15%) and diets with soy hull binders (55%) increased to about 40% at the same immersion period.

The vast majority of cultured aquatic animals are fed and finished in the summer months when water temperatures are higher. For Pacific white shrimp, the optimum temperature for maximum growth rates is about 27° C. to about 30° C. Reduced growth rates and feed intake of Pacific white shrimp are seen when water temperatures dip below 23° C.

Figure 5:
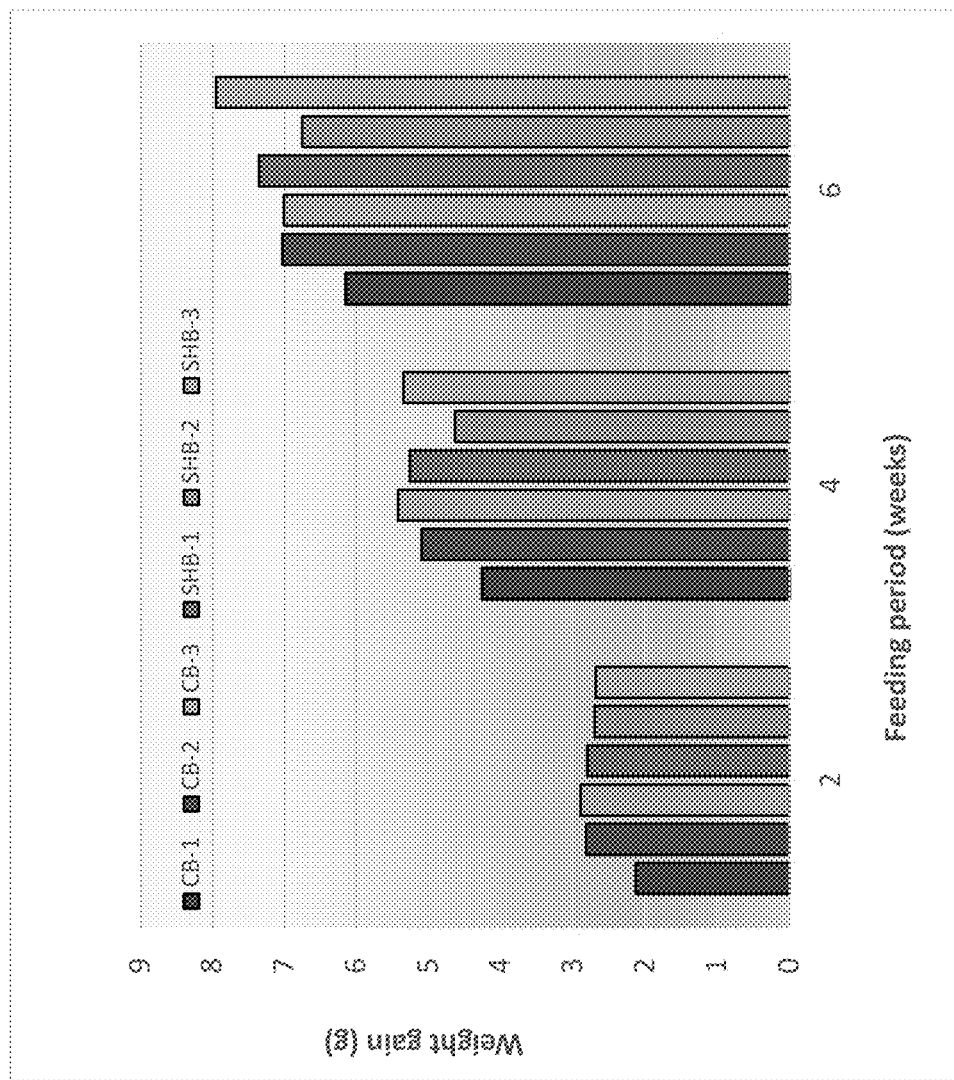
FIG. 5 is a histogram showing the weight gain of Pacific white shrimp fed diets supplemented with 2% binder from various sources for two (2) weeks. No significant differences were observed among treatment means at P<0.05.

FIG. 5 shows the weight gain of Pacific white shrimp fed diets supplemented with 2% binder from various sources for six (6) weeks, including diets made using the biomass-derived binders described herein. No significant differences were observed among treatment means at P<0.05. As shown in FIG. 5, the growth rate of the shrimp was not significantly affected by the type of binder used in the feed. Feed intake as well was not influenced by binder type (data not shown). This indicates that palatability of the diets was not altered by using the biomass-derived binders disclosed herein.

Under intensive production systems, aquatic animals are exposed to numerous stressors including poor water quality, which may negatively affect their health. Aquatic animal feeds made using the binders described herein have excellent water stability and as well as protein retention when submerged. The binders thus improve overall yield by keeping the water cleaner without impacting the animal growth rates. An added benefit is that the biomass used in the subject process, as well as the processing steps needed are very affordable.

Example 3

Lemon Peel as Binder

Figure 6:
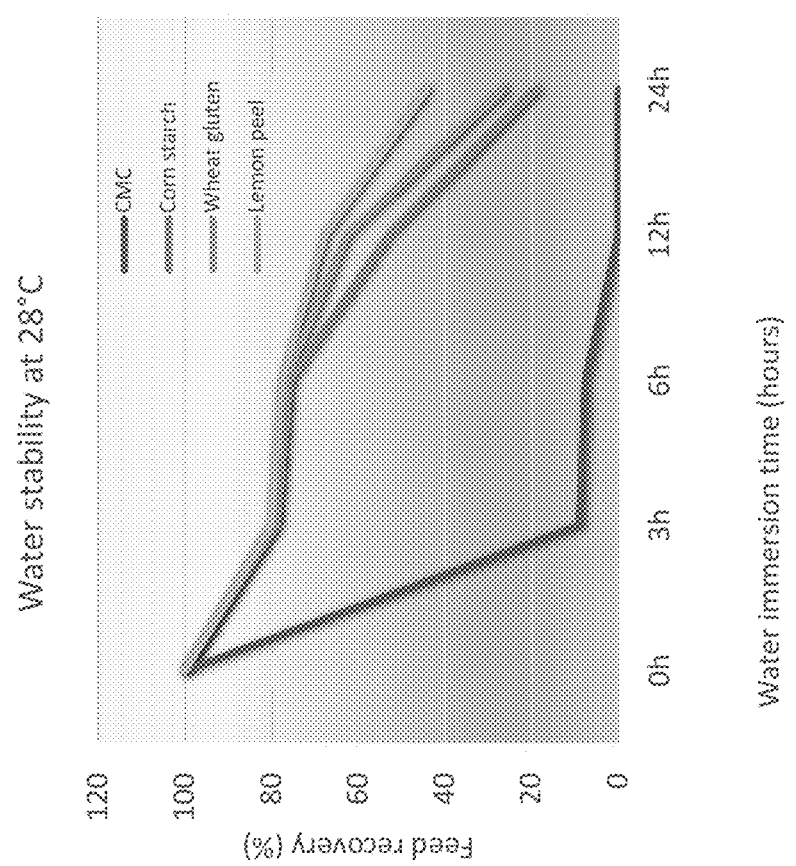
FIG. 6 is a graph showing percent pellet recovery comparison of the inventive diets described herein with diets using control binders (corn starch and wheat gluten) and diet with lemon peel binder, tested at four leaching periods (3 h, 6 h 12 h and 24 h) at a water temperature of 28° C. Values are the mean of four replicate runs.

Feed rations were made as described hereinabove using as the binder CMC, corn starch, wheat gluten or lemon peel. The rations were submersed in water at 20° C. for periods of 3 hours, 6 hours, 12 hours, and 24 hours and the feed recovery determined. The results are shown in FIG. 6. At the 3-hour and 6-hour time points, the corn starch, wheat gluten, and lemon peel diets were holding up quite well, with feed recoveries roughly identical at approximately 80% after submersion for 6 hours. Diets using CMC as the binder, in contrast, were all but completely dissolved after submersion for 6 hours, with recoveries hovering around 10%.

At time points greater than 6 hours, the diet that used lemon peel as the binder showed slightly improved water stability than the diets containing corn starch or wheat gluten as the binder. Again, see FIG. 6. At the 24-hour time point after immersion, the recovery of the ration using CMC as the binder was zero; the rations using corn starch and wheat gluten had 24-hour recoveries of around 20 to 25%. In contrast, the diet using lemon peel as the binder had a recovery of slightly over 40%.

Figure 7:
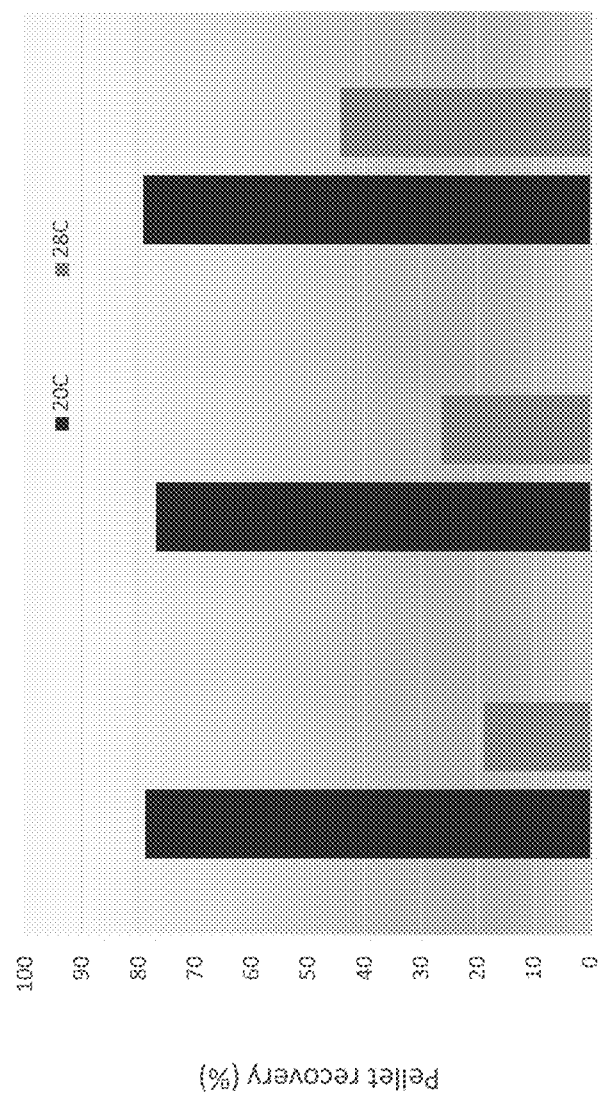
FIG. 7 is a histogram depicting the Effect of water temperature (22° C. and 28° C.) on pellet stability of diets with control binders (corn starch and wheat gluten) and diet with lemon peel-derived binder in water after 24 h leaching period.

In 20° C. water over 24 hours, the diets that used lemon peel as the binder exhibited similar recovery percentages as diets using corn starch and wheat gluten as the binder. See FIG. 7. However, at a water temperature of 28° C., recovery percentages in diets using corn starch binder or wheat gluten binder were significantly reduced (20-25%) as compared to the recovery percentage for diets using a lemon peel binder (~40%). See FIG. 7.

Figure 8:
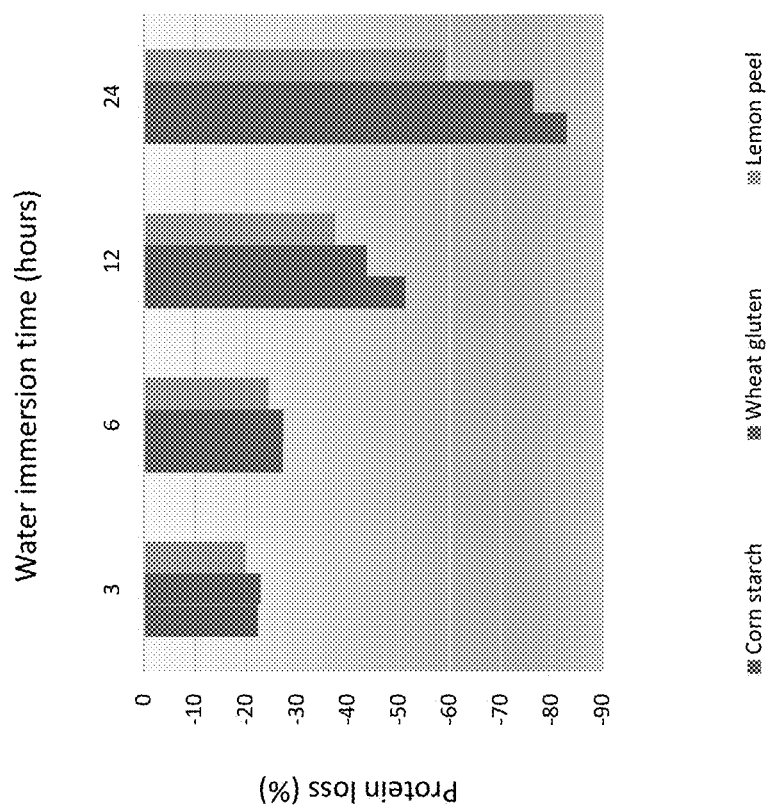
FIG. 8 is a histogram comparing the weight percent loss of crude protein in remaining leached feed pellets made with control binders (corn starch and wheat gluten) and the diet made with lemon peel-derived binder at a water temperature of 28° C. Values are the mean of four replicate runs.

FIG. 8 is a histogram showing protein percentage loss of feeds due to water immersion. At 24 h of water immersion, diets using a lemon peel binder lost about 60% of their dietary protein content. In contrast, diets using wheat gluten as the binder lost 75% of their protein content. Diets using corn starch binder were even worse, losing 83% of their dietary protein content after being immersed in water for 24 hours.

Example 4

Shrimp Feeding Trial

Seven (7) shrimp diets were prepared, each using 2 wt % binder. The control binders were: CB-1=carboxymethyl cellulose (CMC); CB-2=corn starch; CB-3=wheat gluten. The test binders were lemon peel binder (LPB) or soy hull binders (SHB-1=soybean hull acid-mechanical treated; SHB-2=soyhull combination of acid- and alkali-treated Britt jar filtrate; SHB-3=soyhull acid- and alkali-treated Britt jar filtrate with re-added fiber fraction). Three replicate groups of 18 shrimp per tank (initial weight 4.35 g) were offered experimental diets twice daily at 7% total body weight daily for 10 weeks. Shrimp in each aquarium were group-weighed and counted at 2-week intervals. Feed inputs were adjusted based on observed survival and weight gain. At the end of each growth trial, hemolymph from three shrimp in each tank were withdrawn individually and total hemocyte count (THC), oxyhemocyanin, phenoloxidase activity, and hemolymph chemistries were determined. (Hemolymph is the circulating fluid or "blood" of invertebrates, including shrimp. Hemocytes are a type of immune cell in invertebrates. The phenoloxidase enzyme system is a major defense system in many invertebrates, including shrimp.)

Figures 9A, 9B:
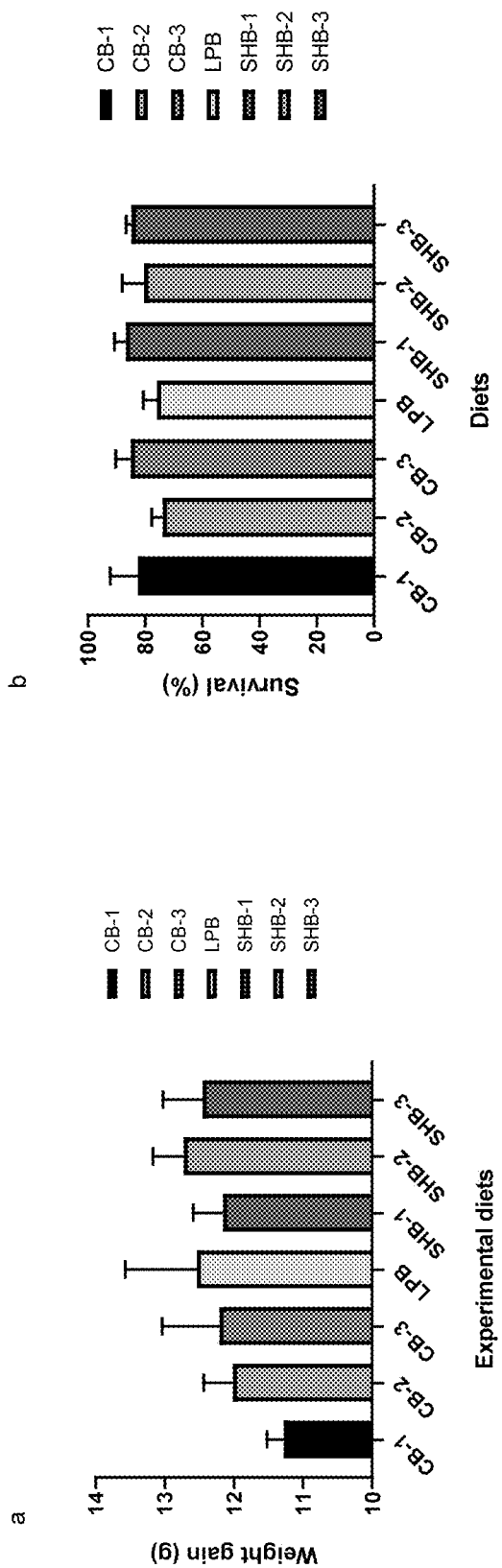
FIGS. 9A and 9B present the weight gain results (FIG. 9A) and survival percentage FIG. 9B) during the feeding trail of Pacific white shrimp. No significant differences were observed among treatment means at P<0.05.

Results: Weight gain and survival of Pacific white shrimp fed diets with different binders are presented in FIGS. 9A (weight gain per diet) and 9B (survival percentage per diet). Weight gain of shrimp fed diets with CB-1 binder (carboxymethyl cellulose) was lowest (11.3 g). Weight gain of shrimp fed diets with SHB-2 binder (soyhull combination of acid- and alkali-treated Britt jar filtrate) was highest (12.7 g). No significant differences were observed in final weight gain (FIG. 9A). Similarly, survival rates (ranging from 73.9% to 86.8%) during the feeding trail were not significantly affected by different binder types (FIG. 9B).

Figures 10A, 10B, 10C:
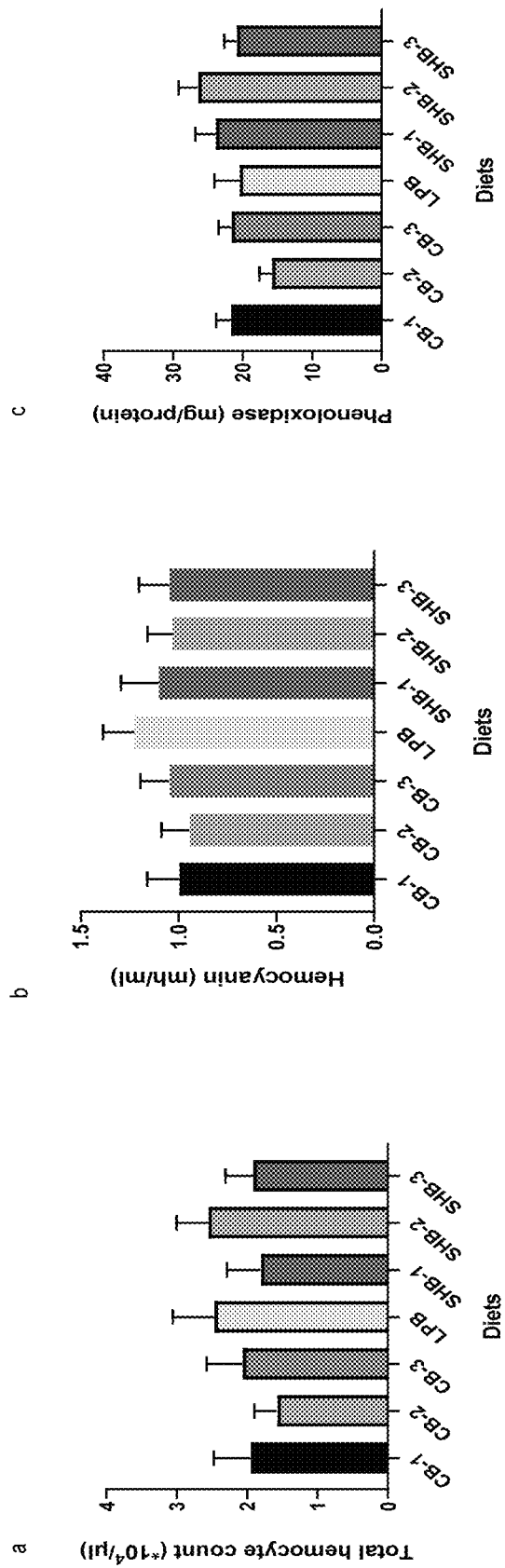
FIGS. 10A, 10B, and 10C show the total hemocyte count (FIG. 10A), oxyhemocyanin level (FIG. 10B), and hemocyte phenoloxidase activity (FIG. 10C) of Pacific white shrimp fed diets supplemented with 2% binder either from control binders (CB-1: Carboxymethyl cellulose (CMC); CB-2: corn starch; CB-3: wheat gluten) or with lemon peel binder (LPB) or soy hull binders (SHB-1: soybean hull acid-mechanical treated; SHB-2: soyhull combination of acid and alkali treated Britt jar filtrate; SHB-3: soyhull acid and alkali treated Britt jar filtrate with re-added fiber fraction) for 10 weeks.

The groups fed diets with soyhull or lemon peel binder showed similar or slightly improved hemolymph parameters compared to commercial binders used. See FIGS. 10A (total hemocyte count), 10B (hemocyanin), and 10 C (phenoloxidase).

Figure 11:
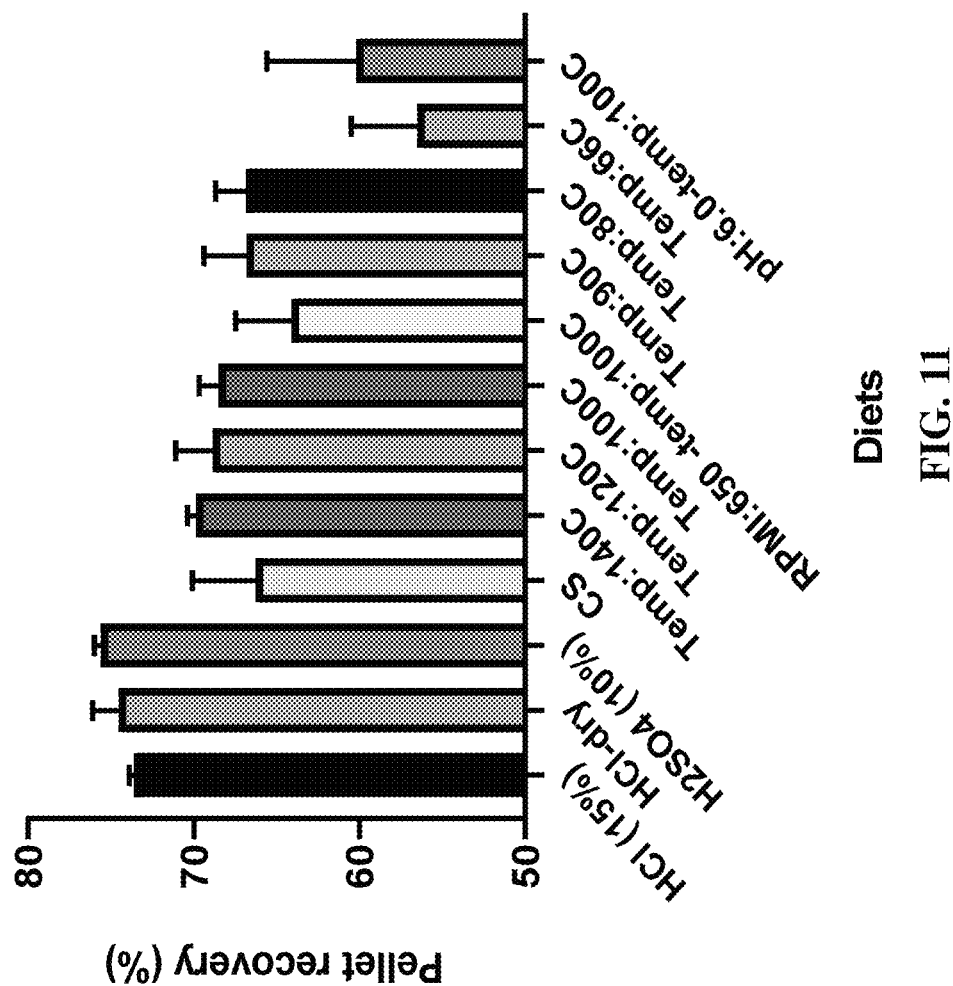
FIG. 11 is a histogram showing weight percent pellet recovery of the diets with soyhull binders prepared at pilot scale.

Percent pellet recovery comparison of the small-volume feed batches with soyhull binders prepared in pilot-scale study with lab made and control binder is shown in FIG. 11. The binders made in pilot-scale quantity were made under a variety of temperatures and pH: Temp=140° C.; Temp=120° C.; Temp=100° C.; RPMI:650-Temp=100° C.; Temp=90° C.; Temp=80° C.; Temp=66° C.; and pH=6, Temp=100° C. The binders made in the lab used HCl (15% solid content), HCl-dry, and $H_2SO_4$ (10% solid content) to make soyhull as the binder. Corn starch is used as a commercial control binder. The recovery percentage was determined after 24 hours of water immersion at 28° C.

Figure 12:
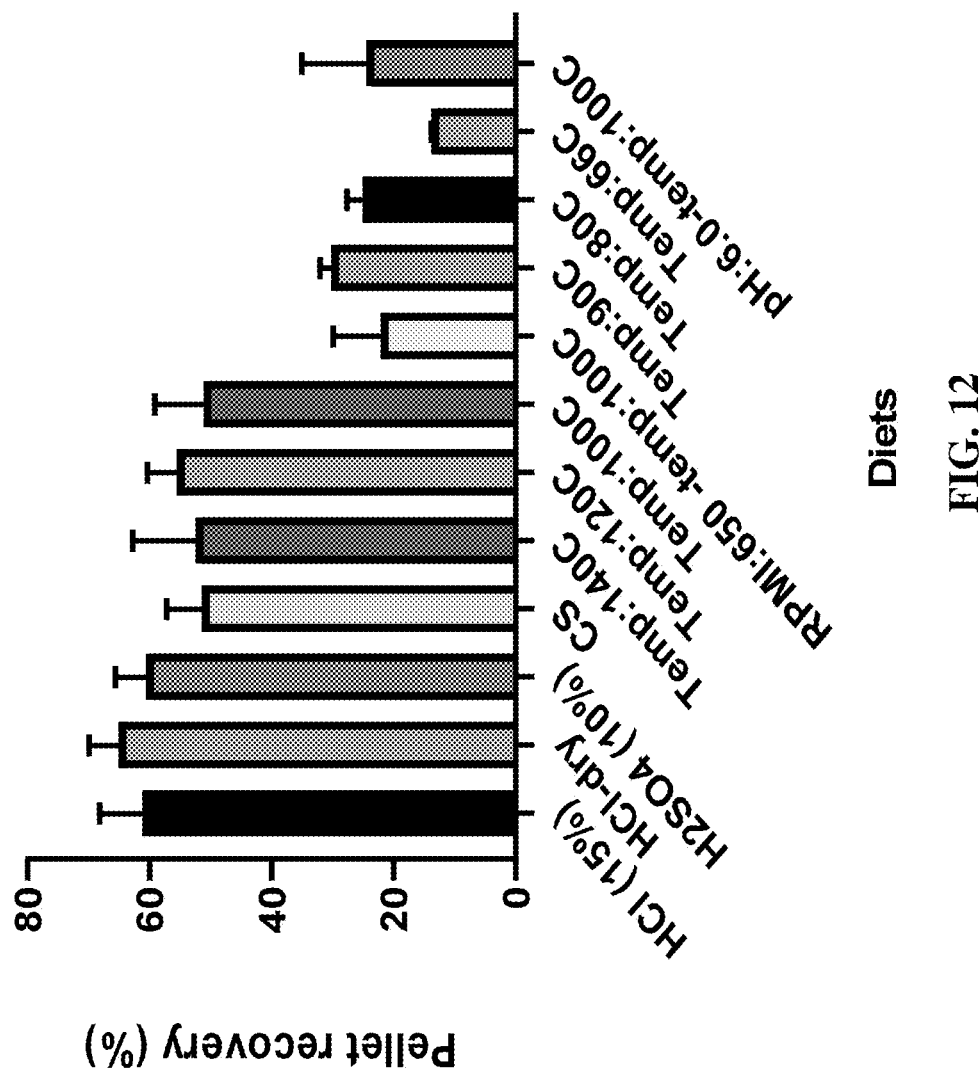
FIG. 12 is a histogram depicting weight percent pellet recovery comparison of the diets with soyhull binders prepared at pilot scale study (Temp:140 C, Temp:120 C, Temp: 100 C, RPMI:650-Temp:100 C, Temp:90 C, Temp:80 C, Temp:66 C and pH:6-Temp:100 C) with control binder (corn starch) and soyhull binders produced in the lab (HCl-15%, HCl-dry and H2SO4-10%), after 48 h of water immersion at 28 C.

FIG. 12: Percent pellet recovery comparison of the diets with soyhull binders prepared at pilot study (Temp:140 C, Temp:120 C, Temp:100 C, RPMI:650-Temp:100 C, Temp: 90 C, Temp:80 C, Temp:66 C and pH:6-Temp:100 C) with control binder (corn starch) and soyhull binders produced in the lab (HCl-15%, HCl-dry and H2SO4-10%), after 48 h of water immersion at 28 C.

As shown by these data, feed rations using 2 wt % lemon peel or soyhull as the binder had no adverse health effects on shrimp as evidenced by weight gain, survival, or hematologic parameters.

What is claimed is:

1. A method of making a binder for extruded, pelleted, or agglomerated animal feed, the method comprising:
   (a) treating a feedstock comprising pectin-containing and protein-containing biomass with an aqueous acidic solution in the absence of exogenously added urea for a time, at a temperature, and at a pH sufficient to yield a mixture containing biomass solids and partially dissolved biomass, wherein acid within the aqueous acidic solution is added exogenously or is formed in situ; and
   (b) mechanically treating the feedstock or the mixture of step (a) to yield a first mechanically treated mixture; and then
   (c) incorporating the first mechanically treated mixture of step (b) as a binder in an animal feed.

2. The method of claim 1, wherein step (c) comprises incorporating the first mechanically treated mixture as a binder in an aquatic animal feed.

3. The method of claim 2, wherein step (c) comprises incorporating the first mechanically treated mixture as a binder in an aquatic animal feed for crustaceans.

4. The method of claim 3, wherein step (c) comprises incorporating the first mechanically treated mixture as a binder in an aquatic animal feed for shrimp.

5. The method of claim 1, wherein the biomass is selected soybean hulls, citrus peels, sugar beet pulp, fruit pomace, vegetable pomace, and rapeseed cake.

6. The method of claim 5, wherein step (c) comprises incorporating the first mechanically treated mixture as a binder in an aquatic animal feed.

7. The method of claim 6, wherein step (c) comprises incorporating the first mechanically treated mixture as a binder in an aquatic animal feed for crustaceans.

8. The method of claim 7, wherein step (c) comprises incorporating the first mechanically treated mixture as a binder in an aquatic animal feed for shrimp.

9. The method of claim 1, wherein step (b) further comprises separating at least a portion of solids present in the first mechanically treated mixture to yield a solids fraction and the remaining first mechanically treated mixture.

10. The method of claim 9, wherein the biomass is selected from soybean hulls, citrus peels, sugar beet pulp, fruit pomace, vegetable pomace, and rapeseed cake.

11. The method of claim 9, wherein step (c) comprises incorporating the first mechanically treated mixture as a binder in an aquatic animal feed.

12. The method of claim 11, wherein step (c) comprises incorporating the first mechanically treated mixture as a binder in an aquatic animal feed for crustaceans.

13. The method of claim 12, wherein step (c) comprises incorporating the first mechanically treated mixture as a binder in an aquatic animal feed for shrimp.

14. The method of claim 9, further comprising:
   (b)(i) treating the solids fraction with an aqueous, alkaline solution for a time, at a temperature, and at a pH sufficient to yield a second mixture containing biomass solids and partially dissolved biomass; and then
   (b)(ii) separating at least a portion of solids present in the second mixture to yield a solids fraction and the remaining second mixture; and then
   (b)(iii) combining the second mixture with the first mechanically treated mixture; and
   wherein step (c) comprises incorporating the combined first mechanically treated mixture and the second mixture of step (b)(iii) as a binder in an animal feed.

15. The method of claim 14, wherein the biomass is selected from soybean hulls, citrus peels, sugar beet pulp, fruit pomace, vegetable pomace, and rapeseed cake.

16. The method of claim 14, wherein step (c) comprises incorporating the first mechanically treated mixture combined with the second mixture as a binder in an aquatic animal feed.

17. The method of claim 16, wherein step (c) comprises incorporating the first mechanically treated mixture combined with the second mixture as a binder in an aquatic animal feed for crustaceans.

18. The method of claim 17, wherein step (c) comprises incorporating the first mechanically treated mixture combined with the second mixture as a binder in an aquatic animal feed for shrimp.

19. An animal feed comprising a binder made according the process recited in claim 1.

20. An animal feed comprising a binder made according the process recited in claim 9.

21. An animal feed comprising a binder made according the process recited in claim 14.

* * * * *